US008996999B2

(12) United States Patent
Yi

(10) Patent No.: US 8,996,999 B2
(45) Date of Patent: Mar. 31, 2015

(54) MOBILE TERMINAL DETERMINING WHETHER TO TRANSMIT DISPLAY DATA ACCORDING TO PRIVACY PROPERTY, AND CONTROLLING METHOD THEREOF

(75) Inventor: Woojoon Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 654 days.

(21) Appl. No.: 13/088,899

(22) Filed: Apr. 18, 2011

(65) Prior Publication Data

US 2011/0296308 A1    Dec. 1, 2011

(30) Foreign Application Priority Data

May 31, 2010 (KR) .................. 10-2010-0050881

(51) Int. Cl.
*G06F 3/00* (2006.01)
*G06F 7/04* (2006.01)
*G06F 15/16* (2006.01)
*G06F 17/30* (2006.01)
*H04N 7/16* (2011.01)
*G06F 21/52* (2013.01)

(52) U.S. Cl.
CPC .......... *G06F 21/52* (2013.01); *G06F 2221/032* (2013.01)
USPC ........... 715/733; 709/227; 709/231; 709/232; 726/27

(58) Field of Classification Search
USPC .............. 709/227, 231, 232; 726/27; 715/733
See application file for complete search history.

(56) References Cited

U.S. PATENT DOCUMENTS

| | | | | |
|---|---|---|---|---|
| 6,011,857 | A * | 1/2000 | Sowell et al. ................. | 382/100 |
| 6,460,074 | B1 * | 10/2002 | Fishkin ........................ | 709/206 |
| 7,080,124 | B1 * | 7/2006 | Shankar ........................ | 709/206 |
| 2003/0028610 | A1 * | 2/2003 | Pearson ........................ | 709/213 |
| 2003/0093790 | A1 * | 5/2003 | Logan et al. ..................... | 725/38 |
| 2003/0132958 | A1 * | 7/2003 | Himmel et al. ............... | 345/745 |
| 2004/0070678 | A1 * | 4/2004 | Toyama et al. ............. | 348/231.3 |
| 2004/0128302 | A1 * | 7/2004 | Schirmer et al. ............. | 707/101 |
| 2004/0168121 | A1 * | 8/2004 | Matz ............................. | 715/513 |
| 2004/0233180 | A1 * | 11/2004 | Hiroi et al. .................... | 345/204 |
| 2005/0278333 | A1 * | 12/2005 | Daniels et al. .................... | 707/9 |
| 2005/0289127 | A1 * | 12/2005 | Giampaolo et al. ............. | 707/3 |
| 2006/0004697 | A1 * | 1/2006 | Lipsky et al. ..................... | 707/2 |
| 2006/0015894 | A1 * | 1/2006 | Nishinaga et al. ............... | 725/30 |
| 2006/0170669 | A1 * | 8/2006 | Walker et al. ................. | 345/418 |
| 2006/0212455 | A1 * | 9/2006 | Perry et al. .................... | 707/100 |
| 2007/0180100 | A1 * | 8/2007 | Biggs et al. .................... | 709/224 |
| 2008/0148184 | A1 * | 6/2008 | Davis ............................ | 715/810 |
| 2008/0155057 | A1 * | 6/2008 | Khedouri et al. ............. | 709/217 |
| 2008/0215996 | A1 * | 9/2008 | Vega et al. .................... | 715/760 |
| 2009/0164892 | A1 * | 6/2009 | Flake et al. .................... | 715/273 |
| 2009/0204580 | A1 * | 8/2009 | Seamon et al. ................... | 707/3 |
| 2009/0217356 | A1 * | 8/2009 | Scott et al. ........................ | 726/4 |

(Continued)

*Primary Examiner* — Eric J Bycer
(74) *Attorney, Agent, or Firm* — Birch, Stewart, Kolasch & Birch, LLP

(57) ABSTRACT

According to an embodiment of the present invention, a mobile terminal includes a display unit configured to display at least one display data, a communication unit configured to exchange the at least one display data externally, and a controller configured to establish a data path to an external display device via the communication unit, to control the at least one display data displayed on the display unit to be transmitted to and to be displayed on the external display device via the data path, and to determine whether to transmit the at least one display data according to a privacy property, wherein the privacy property indicates whether a sharing restriction is set for each of the at least one display data.

17 Claims, 11 Drawing Sheets

(56) References Cited

U.S. PATENT DOCUMENTS

2010/0318571 A1* 12/2010 Pearlman et al. ............. 707/784
2011/0004922 A1* 1/2011 Bono et al. ........................ 726/4
2011/0149014 A1* 6/2011 Chung ....................... 348/14.12
2011/0246572 A1* 10/2011 Kollenkark et al. .......... 709/204

* cited by examiner

FIG. 4
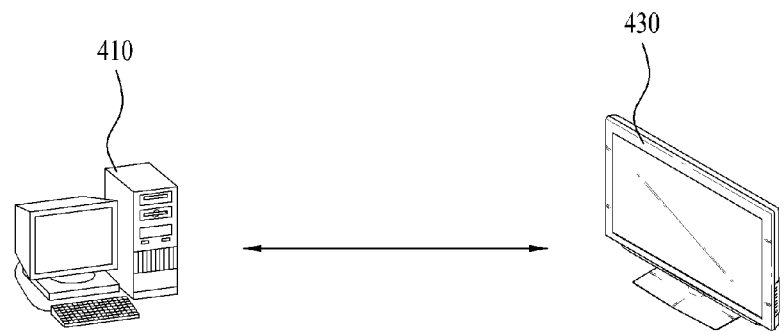
(a)
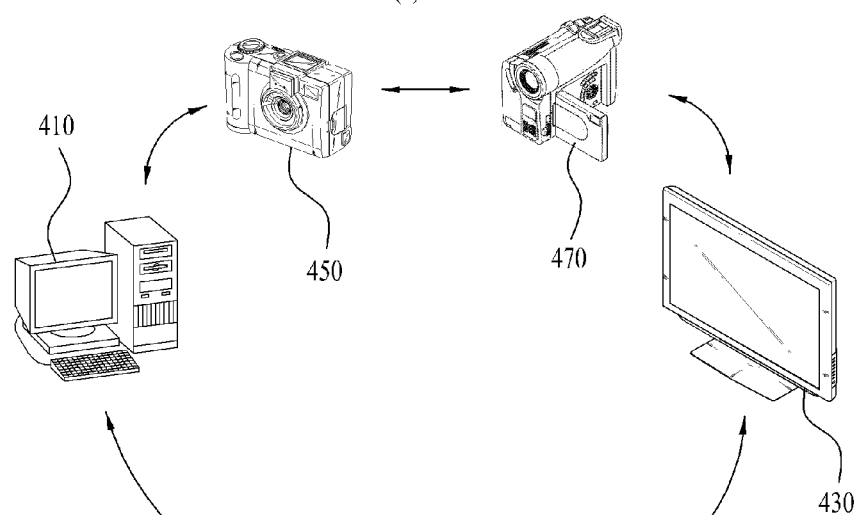
(b)

FIG. 7
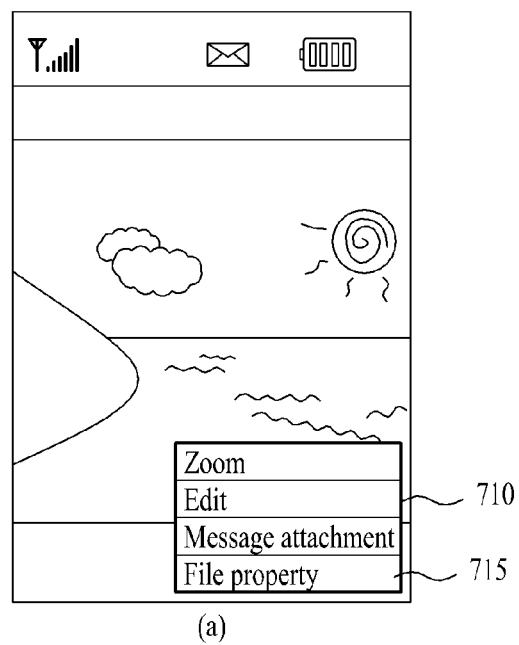
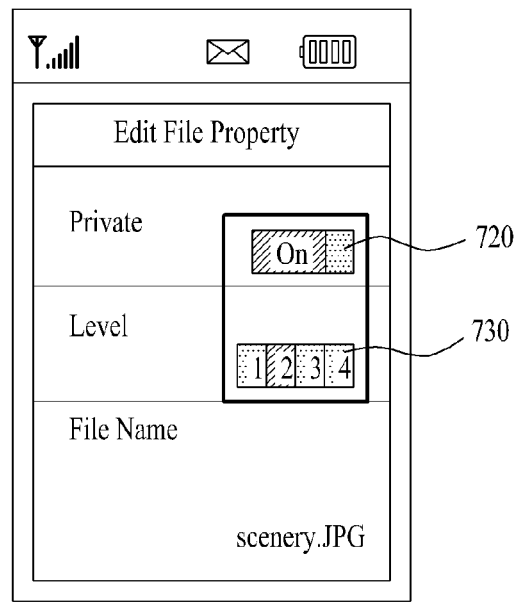

FIG. 9
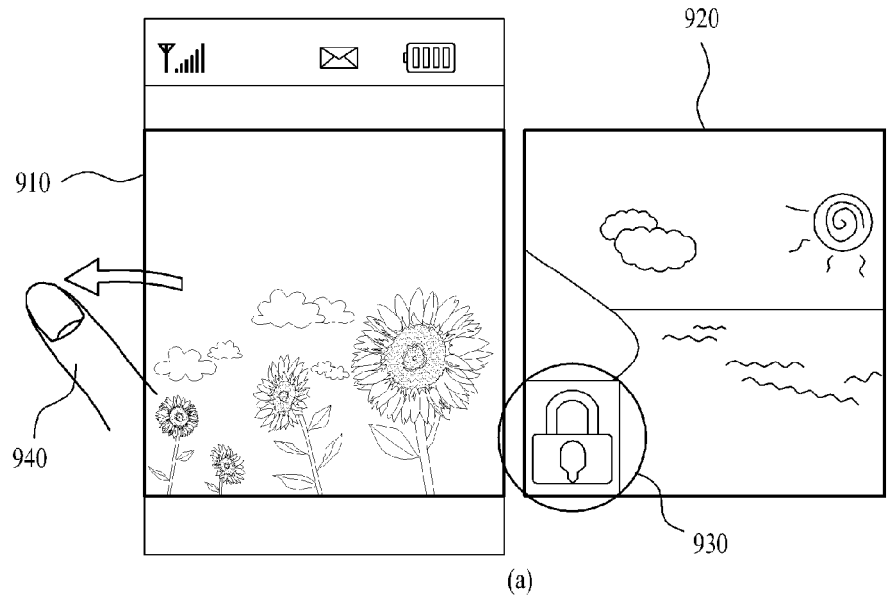
(a)
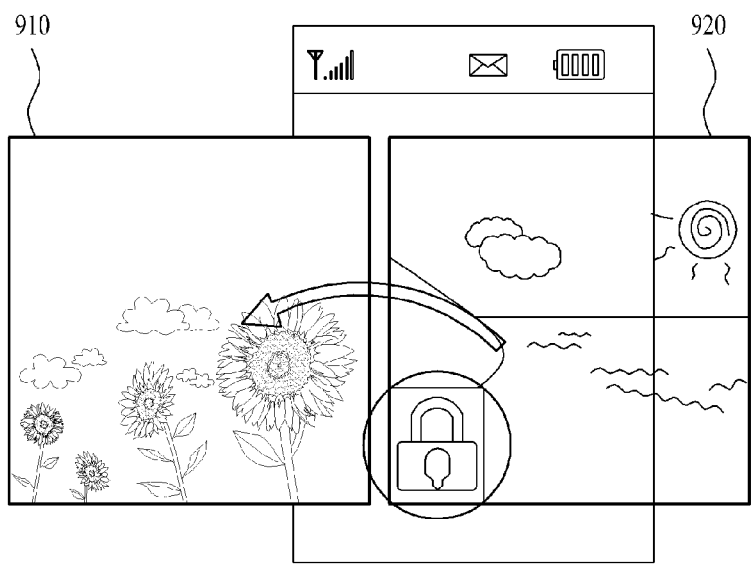
(b)
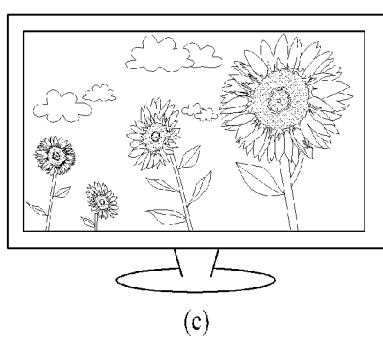
(c)
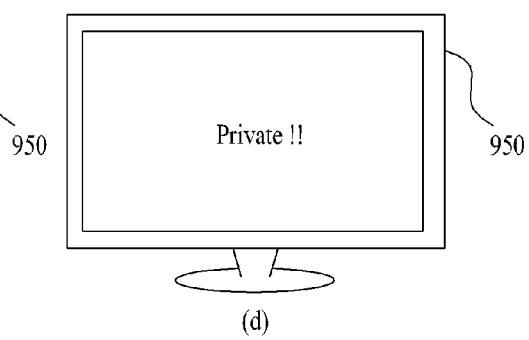
(d)

FIG. 11
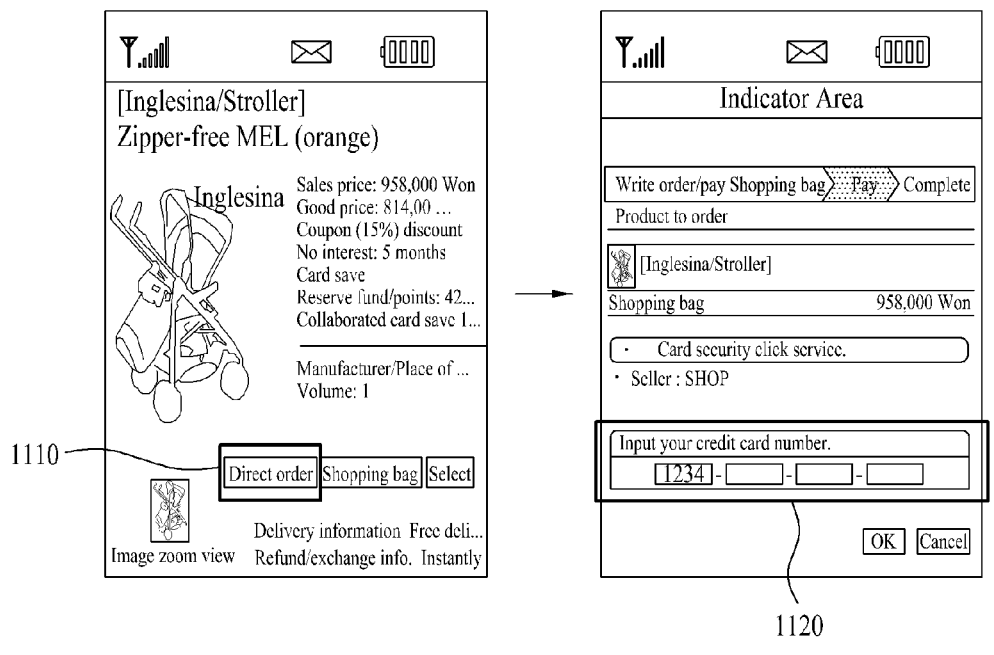
(a)
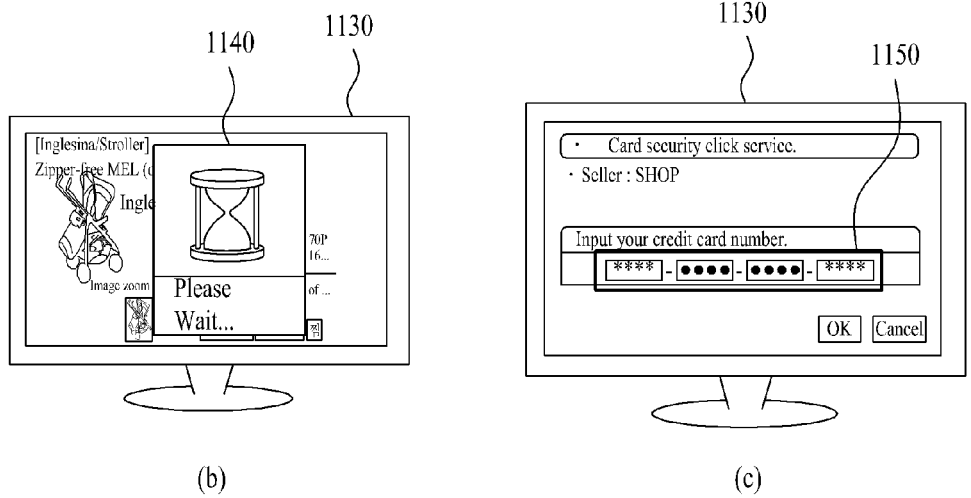
(b) (c)

MOBILE TERMINAL DETERMINING WHETHER TO TRANSMIT DISPLAY DATA ACCORDING TO PRIVACY PROPERTY, AND CONTROLLING METHOD THEREOF

Pursuant to 35 U.S.C. §119(a), this application claims the benefit of earlier filing date and right of priority to Korean Application No. 10-2010-0050881, filed on May 31, 2010, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for displaying an image via an external display device.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural parts and/or software parts of the terminal.

Recently, electronic appliances capable of exchanging information in-between by being connected to each other are ongoing to be developed. Therefore, the demand of an efficient and convenient method of displaying an image in a mobile terminal via an external image display device is rising. Specifically, the demand for a method of protecting sensitive information in the course of an image sharing process is ongoing to rise.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which an image can be conveniently shared via an external display device.

Another object of the present invention is to provide a mobile terminal and controlling method thereof, by which an image can be selectively shared in consideration of property of shared information in case of sharing an image via an external display device.

It will be appreciated by persons skilled in the art that the objects that can be achieved by the present invention are not limited to what has been particularly described hereinabove and the above and other objects that the present invention can achieve will be more clearly understood from the following detailed description taken in conjunction with the accompanying drawings.

To achieve these objects and other advantages and in accordance with the purpose of the invention, as embodied and broadly described herein, a mobile terminal according to the present invention includes a display unit, a communication unit configured to exchange data externally, and a controller establishing a data path to an external display device via the communication unit, the controller controlling at least one display data corresponding to at least one portion of the data to be transmitted to the specific external display device via the data path to enable the at least one portion of the data displayed on the display unit to be displayed via the external display device, the controller controlling whether to transmit the at least one display data to be determined according to whether a privacy property indicating a sharing restriction is set for each of the at least one display data.

In another aspect of the present invention, a method of controlling a mobile terminal includes the steps of searching at least one external display device via a communication unit, establishing a data path to a specific one of the searched external display devices, preparing a display data including at least one portion of data displayed on a display unit, determining whether a privacy property indicating a sharing restriction is set for the display data, and determining whether to transmit the display data via the data path according to a result of the former determining step.

Accordingly, the present invention provides the following effects and/or advantages.

First of all, a mobile terminal according to at least one embodiment of the present invention is able to conveniently share and display an image via an external display device.

Secondly, in case of sharing an image via an external display device, the present invention facilitates a user to select whether to share data by real time or in advance in consideration of data property, thereby protecting user's privacy.

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

According to an embodiment of the present invention, a mobile terminal includes a display unit configured to display at least one display data, a communication unit configured to exchange the at least one display data externally, and a controller configured to establish a data path to an external display device via the communication unit, to control the at least one display data displayed on the display unit to be transmitted to and to be displayed on the external display device via the data path, and to determine whether to transmit the at least one display data according to a privacy property, wherein the privacy property indicates whether a sharing restriction is set for each of the at least one display data.

According to an embodiment of the present invention, a method of controlling a mobile terminal includes searching for at least one external display device via a communication unit, establishing a data path to a specific external display device from the searched external display devices, preparing display data displayed on a display unit to be transmitted to the specific external display device via the data path, determining whether a privacy property indicating a sharing restriction is set for the display data, and determining whether to transmit the display data via the data path according to a result of the privacy property determination.

According to an embodiment of the present invention, a method of controlling a mobile terminal includes searching for at least one external display device via a communication unit, establishing a data path to a specific external display device from the searched external display devices, preparing display data displayed on a display unit to be transmitted to the specific external display device via the data path, determining whether a privacy property indicating a sharing restriction is set for the display data, determining whether to transmit the display data via the data path according to a result of the privacy property determination, displaying, via the display unit, a prescribed visual effect indicating that the privacy property on, when it is determined that the privacy property is set for the display data, transmitting the privacy property set display data to the specific external device when a first user input to transmit the privacy property set display data is received, and transmitting a preset image different from the privacy property set display data or maintaining a previously displayed image on the specific external device when a second user input to restrict transmission the privacy property set display data to the specific external device is received.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a diagram for example of connections among digital devices applicable to embodiments of the present invention;

FIG. 7 is a diagram of display screen configurations for one example of giving a privacy property to data in a mobile terminal according to one embodiment of the present invention;

FIG. 9 is a diagram of display screen configurations for one example of restricting data of privacy property from being shared according to one embodiment of the present invention;

FIG. 11 is a diagram of display screen configurations for one example of restricting a value inputted to a prescribed in a mobile terminal from being shared in a mobile terminal according to another embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
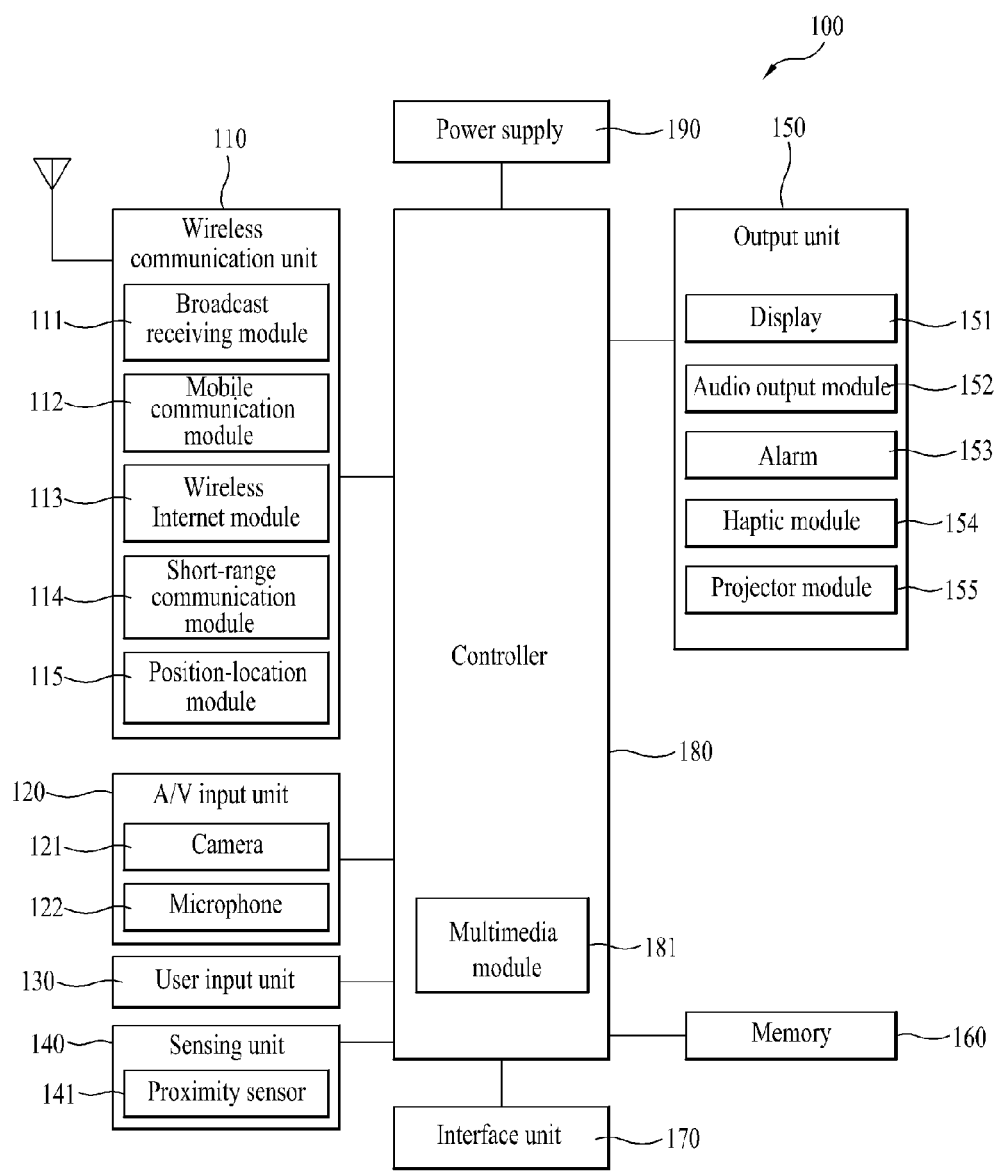
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless interne module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as BLUETOOTH® and ZigBee®, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160.

Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
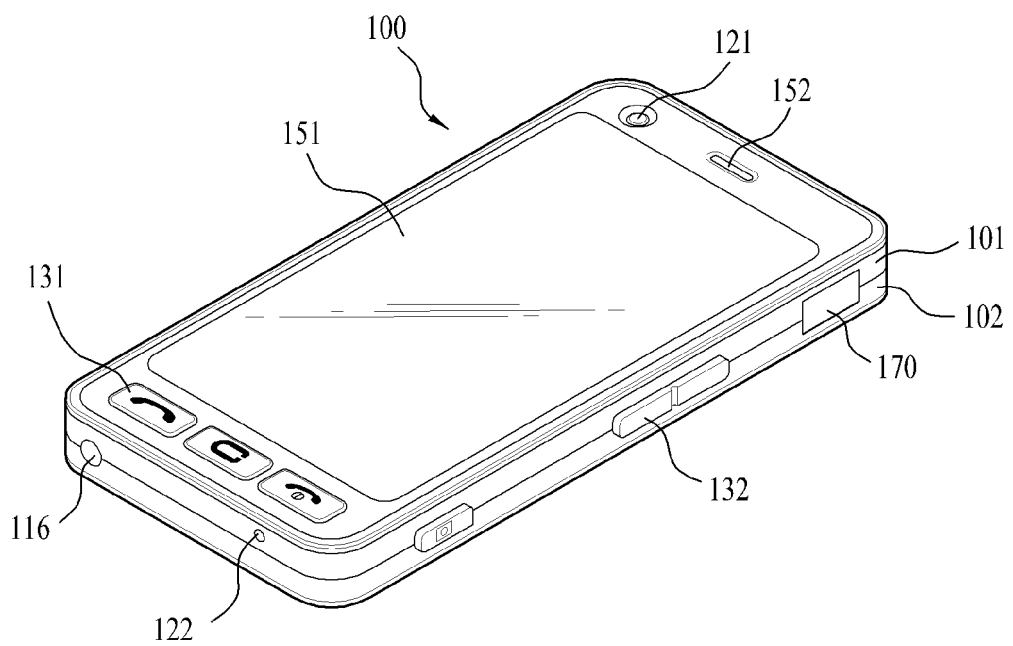
FIG. 2 is a front perspective diagram of a mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Interconnected operational mechanism between the display 151 and the touchpad 135 are explained with reference to FIG. 3 as follows.

Figure 3:
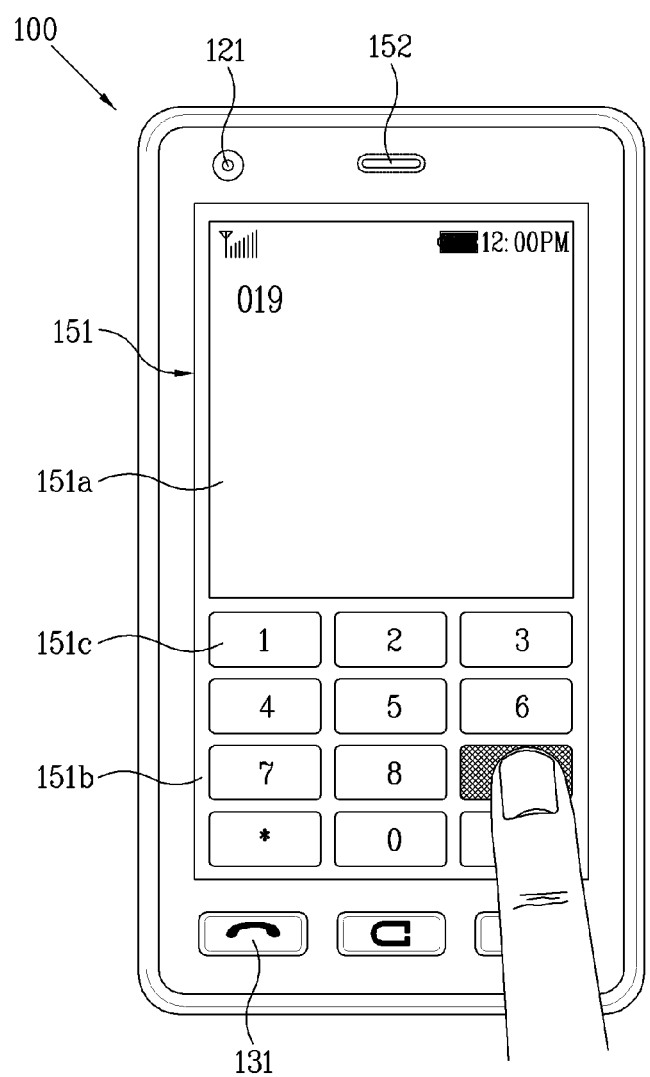
FIG. 3 is a front diagram of a mobile terminal according to one embodiment of the present invention for explaining one operative status of the mobile terminal.

FIG. 3 is a front-view diagram of a terminal according to one embodiment of the present invention for explaining an operational state thereof.

First of all, various kinds of visual information can be displayed on the display 151. And, theses information can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3 shows that a touch applied to a soft key is inputted through a front face of a terminal body.

The display 151 is operable through an entire area or by being divided into a plurality of regions. In the latter case, a plurality of the regions can be configured interoperable.

For instance, an output window 151a and an input window 151b are displayed On the display 151. A soft key 151c representing a digit for inputting a phone number or the like is outputted to the input window 151b. If the soft key 151c is touched, a digit corresponding to the touched soft key is outputted to the output window 151a. If the first manipulating unit 131 is manipulated, a call connection for the phone number displayed on the output window 151a is attempted.

Besides, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

To cope with a case that both of the display (touch screen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display 151 or the touchpad 135.

For clarity and convenience of the following description, a mobile terminal mentioned in the following description is assumed as including at least one of the components shown in FIG. 1. Meanwhile, such a graphic for pointing at a specific object on a display unit or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

In general, an application is conceptionally used as software separately installed and/or executed. Yet, an application mentioned in the description of the present invention conceptionally indicates all targets that visually display information on a prescribed region when a specific function is executed. The controller 180 of the mobile terminal according to the present invention is able to control at least two applications simultaneously. In doing so, the executed applications are displayed on partitioned screens of the display unit 151, respectively. Alternatively, one of the executed applications is displayed on a whole screen of the display unit 151. Alternatively, one of the executed applications is displayed in a manner of blocking at least one portion of a region related to the other executed application. Moreover, assume that the controller 180 of the mobile terminal 100 according to the present invention is able to perform a multitasking function of executing and controlling the above-mentioned at least two applications simultaneously.

Image Display via External Display Device

Recently, the rapidly developed performance of a processor (i.e., the controller 180) of a mobile terminal enables the advanced operations. Moreover, the performance enhancement of the wireless communication unit 110 enables high-speed data communications via various radio interfaces. Accordingly, data, and more particularly, displayed video/contents can be shared between mobile terminals or digital appliances having different display devices. Of course, the data sharing between the appliances or devices can be performed by wire systems as well as wireless systems.

The compatible technologies for the contents exchange between digital devices are internationally ongoing to be standardized. For examples, DLNA (digital living network alliance) participates in the standardization. The DLNA standard proposes various conditions and methods for the mutual data exchanges among various kinds of digital devices. A connecting method, specifications and the like in the embodiments of the presence invention can be supplemented by the DLNA standard documents, by which the present invention is non-limited. Moreover, the present invention can be performed via various kinds of communication interfaces (e.g., Wi-Fi®, BLUETOOTH®, IEEE1394, USB™, infrared communication, etc.). In order to deliver a content to a renderer from a server, a source of the content is intactly delivered and then reproduced, a screen shot of a still cut is transmitted by sampling a video of a displayed content by specific periodicity, or a real-time video streaming in a prescribed frame can be used. Besides, after a separate sharing application for contents sharing has been installed each of the server and the renderer, data exchange can be performed according to the type defined in the sharing application.

FIG. 4 is a diagram for example of connections among digital devices applicable to embodiments of the present invention.

Referring to FIG. 4 (a), a terminal 100 according to the present invention is connected to a computer 410 and a television 430 by wire/wireless to perform contents/data exchanges with the connected computer or television. In this case, contents sharing can be performed in a following manner. Firs of all, one device plays a role as a content server configured to supply a content to the other device and the other plays a role as a renderer configured to receive and display the corresponding content. Alternatively, one device plays a role as a controller configured to control a device playing a role as a content server and the other performs a content display function only. For instance, if the computer 410 becomes a content server, the mobile terminal 100 controls the computer 410 to enable a specific content in the computer 410 to be displayed on the television 430. In addition, the inter-device connection according to the present invention can be configured in a manner that a content server also performs a control function and that a renderer responsible for a display of content performs the control function together.

The above-described inter-device connection can be configured in a manner of further including a digital camera 450 and a digital camcoder 470 [FIG. 4 (b)].

In the following description, explained is a method of sharing a content and application executed screen of a mobile terminal via connections among digital devices including the mobile terminal.

First Embodiment

According to one embodiment of the present invention, provided is a method of considering a property of information displayed in case of displaying at least one portion of information of an application executed in a mobile terminal.

In this case, the external display device conceptionally includes every device capable of displaying prescribed data via its display device by being connected to a mobile terminal 100 according to the present invention by wire/wireless through a means/method for data sharing between digital appliances including the aforesaid DLNA.

Moreover, 'considering a property of information' means that a setting value given to a file, for which restriction of sharing is required in association with user's privacy or sharing intention and the like, or such a value difficult to be open as a credit card number, an access password and the like among input values via a user input unit is restricted from being shared or is replaced in a visually different form. Such a sharing-restricted property shall be named a privacy property.

Figure 5:
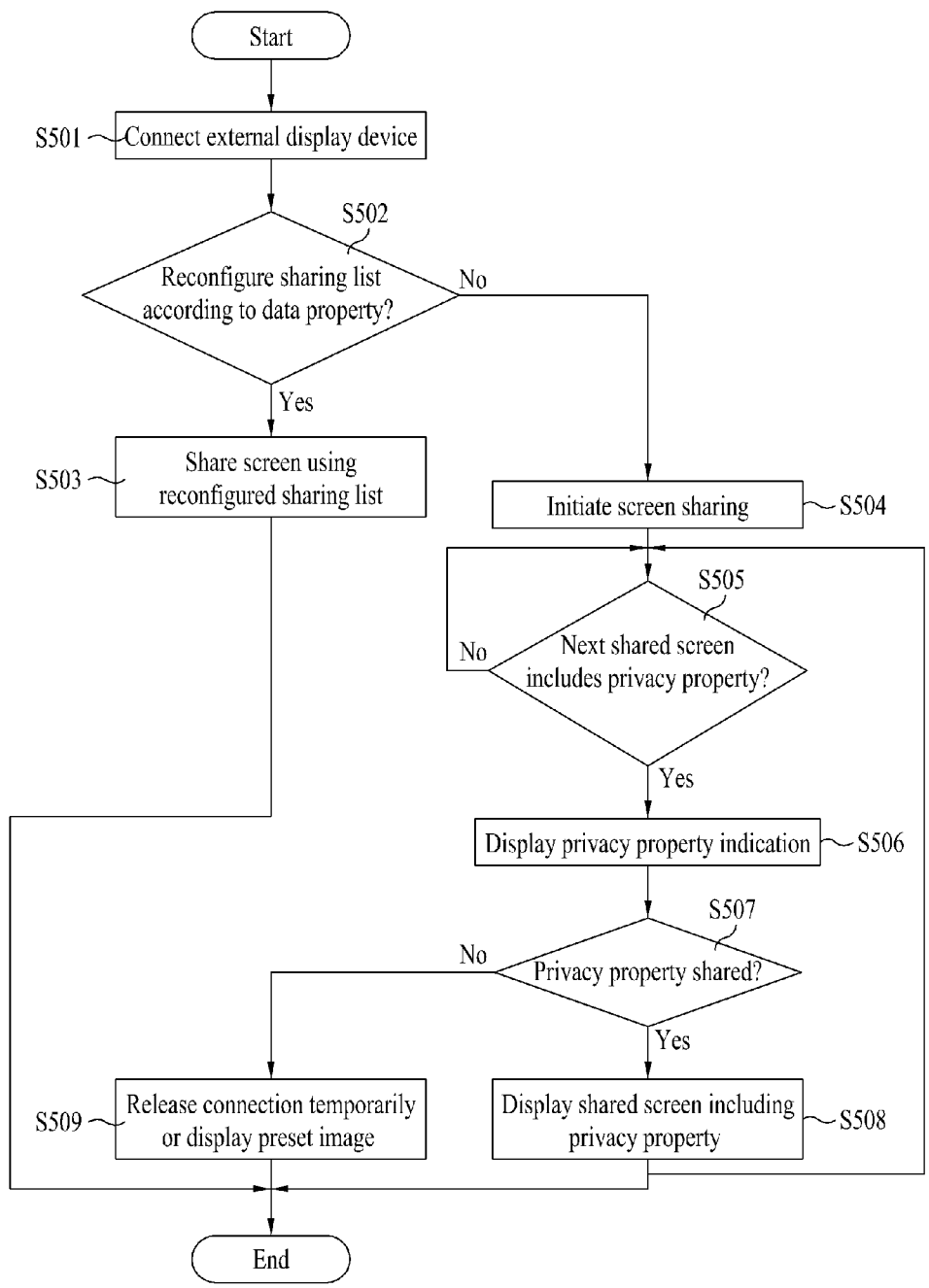
FIG. 5 is a flowchart for a method of sharing information in consideration of property of the information using an external display device according to one embodiment of the present invention.

FIG. 5 is a flowchart for a method of sharing information in consideration of property of the information using an external display device according to one embodiment of the present invention.

Referring to FIG. 5, if a data sharing function is selected according to a prescribed menu manipulation performed by a user, the controller 180 of the mobile terminal 100 searches connectible external display devices around by controlling the wireless communication unit 110. And, one of the found external display devices can be determined as an external display device according to a preset information or user's selection. Thus, the controller 180 controls the wireless communication unit 110 and is able to set a data transmission path to the determined external display device [S501].

In doing so, data to share can be provided in advance as a list according to a type of an executed application. If the data to share includes an image or a video, a thumbnail of the corresponding file can be provided in addition. In this case, a user is able to reconfigure the list of the data to share in accordance with a data property via a prescribed menu manipulation [S502].

In particular, the whole data or file to be shared is displayed in the initially displayed shared data list irrespective of the data properties. In doing so, if the user sets a sharing restriction according to the data property, the list of the data to share can be reconfigured with the rest of the data except the data having a specific property value (e.g., a file having a privacy property, a file having a password, etc.).

In case of performing the reconfiguration of the list, it is able to transmit the data to share via a data path established to enable the corresponding data to be displayed on the external display device in accordance with the reconfigured list of the data to share [S503].

In case that the reconfiguration of the list of the data to share or a display of the data list is not performed at all, the data sharing with the external display device can be directly initiated [S504].

In doing so, the data can be shared in one of the following manners. First of all, an image displayed on the display unit 151 of the mobile terminal 100 is periodically captured to become the transmitted image information or can be streamed as a video in a prescribed frame. Secondly, in case that the data to share exists as a file, the file is transmitted to be played by the external display device.

After the data sharing has been initiated, the data to share can be sequentially transmitted to the external display device from the mobile terminal 100. In doing so, a privacy property can be given to the data that will be shared next to the currently shared data [S505].

In this case, a prescribed visual effect for informing a user that the privacy property is given to the next data to share can be displayed on the display unit 151 [S506].

Moreover, a menu for querying a user's intention on the sharing can be additionally displayed together with the visual effect for the privacy property indication [S507].

If the user selects the sharing of the data having the privacy property given thereto, the controller 180 is able to share the corresponding data with the external display device to enable the corresponding data to be displayed via the external display device [S508].

On the contrary, if the user rejects the sharing of the privacy property given data, the controller 180 temporarily releases the connection to the external display device until data having no privacy property is selected. Alternatively, the controller 180 is able to control a preset image for substituting for the privacy property data to be displayed on the external display device [S509].

In the above described data sharing process, the wireless data sharing via the wireless communication unit 110 is mainly focused, by which the present invention is non-limited. And, it is a matter of course that the data sharing process is applicable to the wire data sharing via the interface unit 170 as well.

Meanwhile, the privacy property can be divided into a plurality of levels. And, it is able to set a presence or non-presence of a grant for each level per external display device. This is explained with reference to FIG. 6 as follows.

Figure 6:
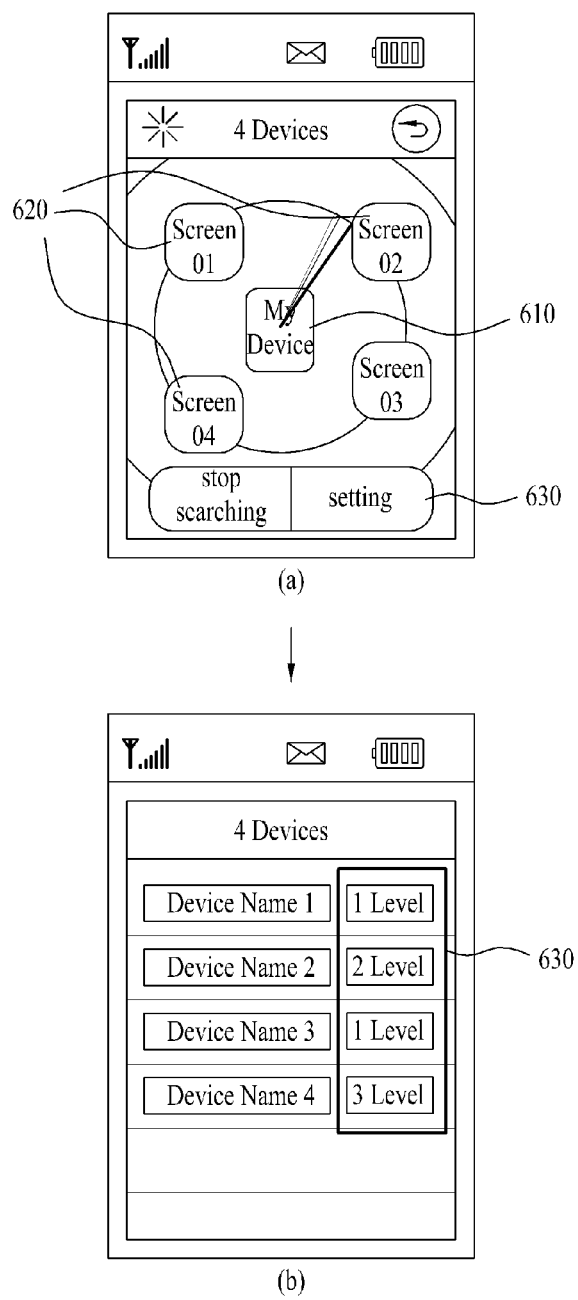
FIG. 6 is a diagram of display screen configurations for one example of setting a level of privacy property per external display device in a mobile terminal according to one embodiment of the present invention.

FIG. 6 is a diagram of display screen configurations for one example of setting a level of privacy property per external display device in a mobile terminal according to one embodiment of the present invention.

Referring to FIG. 6 (a), a search result according to a user's selection of a data sharing function is displayed on a display unit. In particular, icons 620 respectively corresponding to connectible external display devices can be displayed around an icon 610 corresponding to a user's mobile terminal.

If a user selects a setting menu button 630, referring to FIG. 6 (b), a menu for setting a level of a privacy property per external display device is displayed. A user is then able to give a privacy property level different per external display device using the corresponding menu 640. If so, a user needs not to set whether to share data one by one but a presence or non-presence of sharing can be automatically restricted according to a privacy property level set for each data.

In the following description, a type of setting a privacy property per data is explained with reference to FIG. 7.

FIG. 7 is a diagram of display screen configurations for one example of giving a privacy property to data in a mobile terminal according to one embodiment of the present invention.

In FIG. 7, assume a situation of setting a privacy property of a picture file.

Referring to FIG. 7 (a), while a file manager application or a picture file viewer application is being executed, a menu box 710 related to a currently displayed picture file can be displayed by a prescribed menu manipulation via the user input unit 130. Subsequently, if a user selects a file property menu 715, referring to FIG. 7 (b), it is able to select whether to set a privacy property (private) 720 and a corresponding level 730 of the privacy property setting.

In the following description, a detailed example of performing the step S502 in FIG. 5 is explained with reference to FIG. 8.

Figure 8:
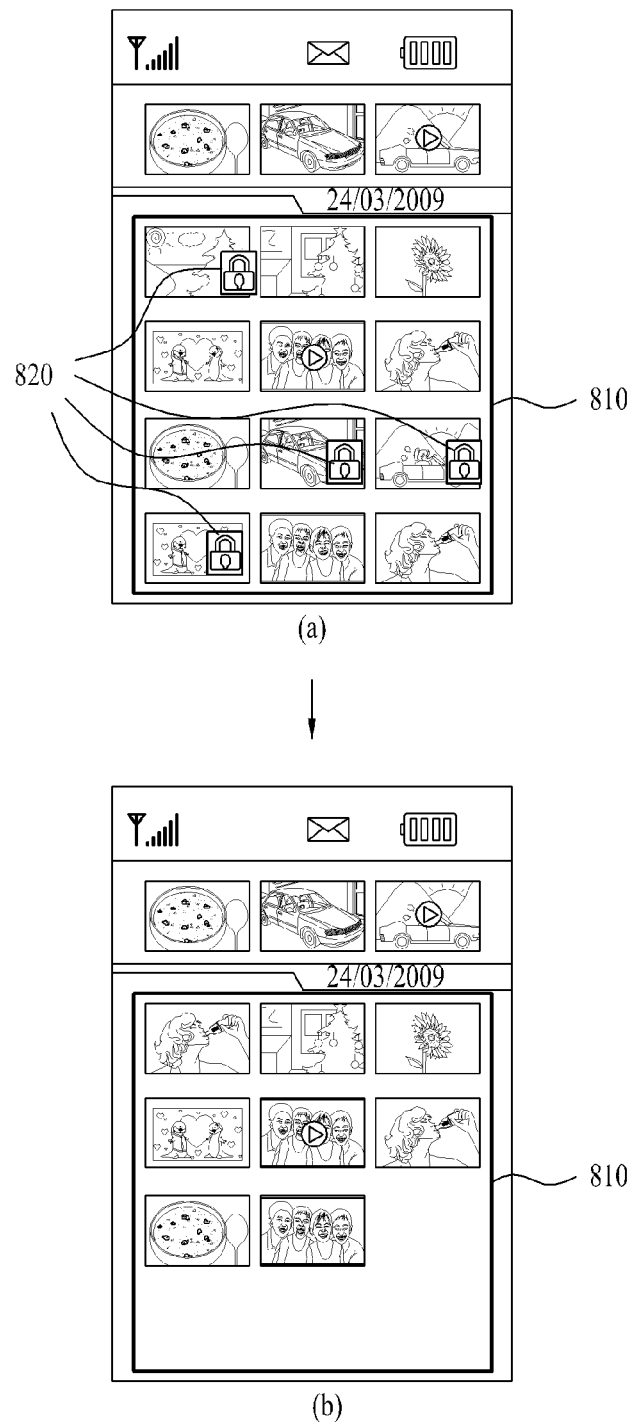
FIG. 8 is a diagram of display screen configurations for one example of reconfiguring a shared data list in a mobile terminal according to one embodiment of the present invention.

FIG. 8 is a diagram of display screen configurations for one example of reconfiguring a shared data list in a mobile terminal according to one embodiment of the present invention.

Referring to FIG. 8 (a), as a file browser or multimedia play application is executed, a picture file and a video file are displayed as thumbnails 810. If a privacy property is set for each file, a lock icon 820 indicating the corresponding privacy property can be displayed on the thumbnail of the corresponding file.

In this case, if a user selects a reconfiguration of a shared data list to exclude the privacy property set data, referring to FIG. 8 (b), it is able to configure a list only including data for which the privacy property is not set. Afterwards, the user is able to conveniently perform the data sharing using the external display device without worrying about exposure of the privacy property set data.

In the following description, a case of setting a privacy property for a data to share next to a currently displayed data is explained with reference to FIG. 9 and FIG. 10.

FIG. 9 is a diagram of display screen configurations for one example of restricting data of privacy property from being shared according to one embodiment of the present invention.

In FIG. 9, when a user enables the mobile terminal 100 according to the present invention to share an image displayed via a picture file viewer with an external display device, explained is a case that a file of a privacy property is excluded from the sharing without a separate guidance or selection.

Referring to FIG. 9 (a), although a privacy property is not given to a currently displayed picture 910, a protection property 930 can be set for a next picture 920 to share.

Afterwards, if a user performs a flicking touch on the touchscreen 151 with a finger to view the next picture 920 (or a key button having the same function is manipulated), referring to FIG. 9 (b), the picture 920 having the privacy property given thereto can be displayed on the touchscreen 151.

Yet, since the privacy property given file is restricted from being shared, referring to FIG. 9 (c), the picture previous to the privacy property given picture can be displayed on the external display device 950 as it is. Alternatively, instead of the privacy property given picture, referring to FIG. 9 (d), a preset image indicating that the privacy property is given to the corresponding data can be displayed on the external display device 950.

Figure 10:
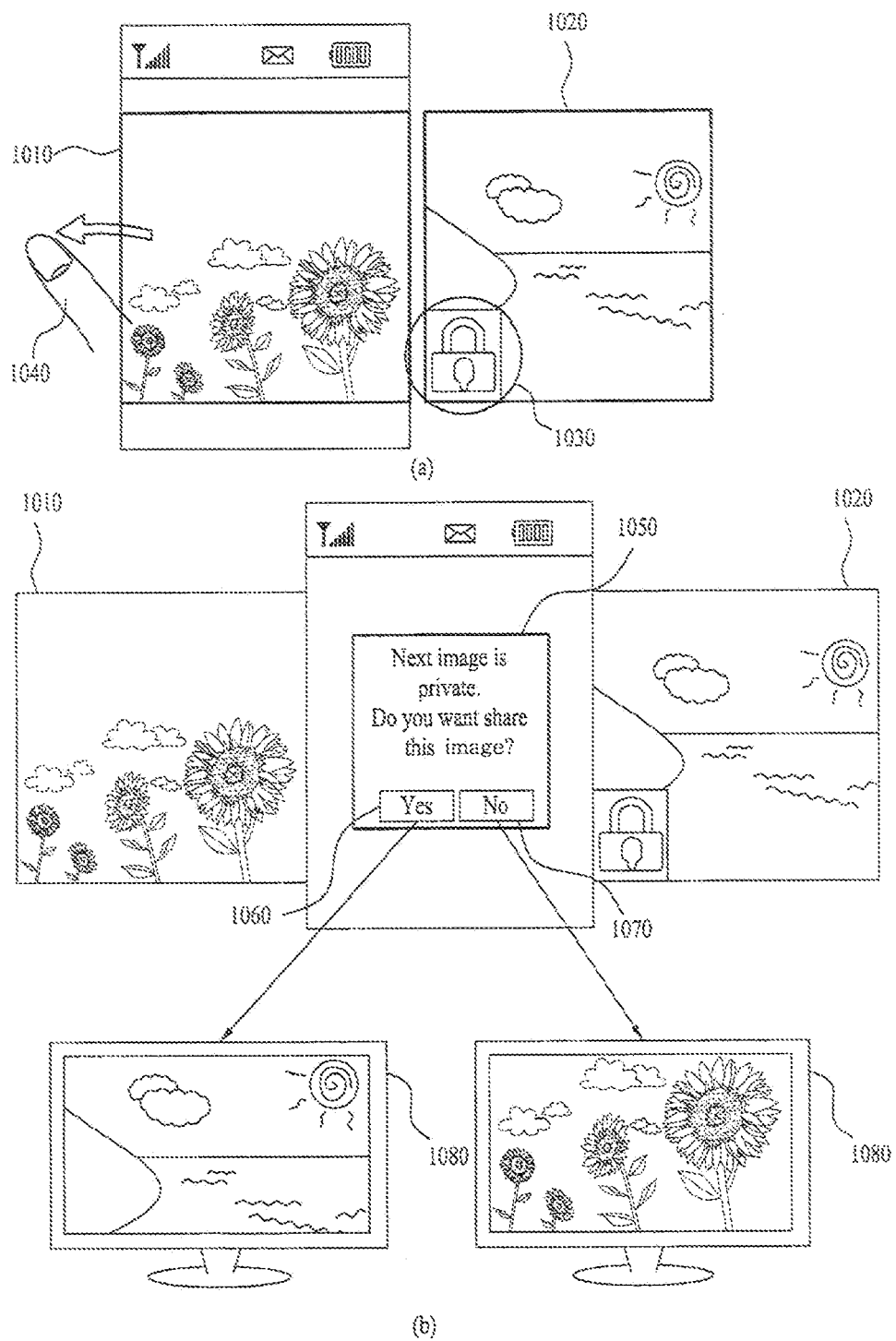
FIG. 10 is a diagram of display screen configurations for another example of restricting data of privacy property from being shared according to one embodiment of the present invention.

FIG. 10 is a diagram of display screen configurations for another example of restricting data of privacy property from being shared according to one embodiment of the present invention.

In FIG. 10, when a user enables the mobile terminal 100 according to the present invention to share an image displayed via a picture file viewer with an external display device, explained is a case that a user selects whether to share a file of a privacy property.

Referring to FIG. 10 (a), a privacy property 1030 can be set for a picture to share 1020 located next to a currently displayed picture 1010. Afterwards, if a user performs a flicking touch on the touchscreen 151 with a finger to view the next picture 1020 (or a key button having the same function is manipulated), referring to FIG. 10 (b), a menu window 1050 for indicating that the privacy property is set for the next data to share and enabling the user to check whether to share the corresponding data can be displayed on the touchscreen 151.

If the user selects 'yes' 1060 to share the corresponding data, a privacy property set picture can be shared and displayed on an external display device 1080. On the contrary, if the user selects 'no' 1070 not to share the corresponding data, a previous picture can be displayed on the external display device 1080 as it is. Of course, if the user rejects the sharing, the controller 180 temporarily releases the connection to the external display device or enables a substitutive image to be displayed in stead of controlling a last shared picture to be displayed on the external display device.

Moreover, while the menu window for indicating that the privacy property is set for the next data to share and enabling the user to check whether to share the corresponding data is being displayed on the display unit of the mobile terminal, the same check window can be displayed on the external display unit, the last shared data is displayed on the external display unit, or the substitutive image can be displayed on the external display device.

Second Embodiment

According to one embodiment of the present invention, the sharing of the whole privacy property set image is restricted. Yet, according to another embodiment of the present invention, if a sharing restriction is necessary for a prescribed field only, a method of restricting or changing a display of a corresponding input value is provided.

FIG. 11 is a diagram of display screen configurations for one example of restricting a value inputted to a prescribed in a mobile terminal from being shared in a mobile terminal according to another embodiment of the present invention.

In FIG. 9, when a user enables the mobile terminal 100 according to the present invention to share an image of a web browser executed in the mobile terminal 100 with an external display device, explained is a case of restricting an exposure of information inputted to a field to which a privacy property should be given.

Referring to FIG. 11 (a), after a user has executed a web browser via the mobile terminal, the user is able to select a pay button 1110 to purchase a specific product in the course of performing a web shopping. Accordingly, a webpage for receiving an input of pay information is displayed on the web browser. The user is then able to input corresponding information to a field for inputting a credit card number, an account number or a password via the user input unit 130. In this case, it is not preferable that the sensitive informations, which should be inputted by the user, are shared and exposed via an external display device.

Therefore, in case that such a field, which should be restricted from being shared, as a credit card number, a password and the like is included in an image shared with the external display device 1130 by the mobile terminal, the image including the corresponding field, as shown in FIG. 11 (b), is not shared but can be replaced by another image 1140. Alternatively, referring to FIG. 11 (c), the information inputted to the corresponding field 1150 is modified into a different form and can be then shared with the external display device.

In order to modify the value inputted to or displayed on the prescribed field or restrict the value from being shared, a reference for the controller 180 to determine a field to give a privacy property to may be required. For this, a user previously sets a specific page address or input field, which should be restricted. Alternatively, in case that a specific code or text sequence is included in an address of a web browser, the sharing can be automatically restricted.

A touch action via a pointer in the foregoing descriptions of the embodiments can be replaced by a command input using a cursor manipulated via a navigation key or a corresponding key button.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a display unit configured to display at least one display data;
a communication unit configured to exchange the at least one display data externally; and
a controller configured to establish a data path to an external display device via the communication unit, to transmit, via the data path to the external device, the at least one display data displayed on the display unit which is to be displayed on the external display device, and to determine whether to transmit the at least one display data according to a privacy property,
wherein the privacy property indicates whether a sharing restriction is set for each of the at least one display data, and
wherein if the privacy property indicating the sharing restriction is set for a next display data to be transmitted to the external display device, the controller controls the display unit to display a prescribed visual effect indicating that the privacy property is set for the next display data via the display unit before displaying the next display data on the display unit when the at least one display data is sequentially transmitted to the external display device.

2. The mobile terminal of claim 1, further comprising:
a user input unit configured to receive a first command from a user, the first command corresponding to excluding the at least one display data having the privacy property indicating the sharing restriction,
wherein the controller generates a first list including the at least one display data, and wherein when the first command is received via the user input unit, the controller generates a second list excluding the at least one display data, which is included in the first list, with the privacy property indicating the sharing restriction and transmits the second list to the external display device.

3. The mobile terminal of claim 1, wherein if the privacy property indicating the sharing restriction is set for a next display data to be transmitted to the external display device, the controller replaces the next display data with a preset image and displays the preset image on the external display device.

4. The mobile terminal of claim 1, wherein if the privacy property indicating the sharing restriction is set for a next display data to be transmitted to the external display device, the controller maintains last displayed data on the external display device.

5. The mobile terminal of claim 1, further comprising:
a user input unit configured to receive a second and third commands from a user,
wherein when the second command for granting a transmission of the next display data is received via the user input unit, the controller transmits the next display data to the external display device.

6. The mobile terminal of claim 5, wherein if the third command for restricting the transmission of the next display data is received via the user input unit, the controller displays a preset image.

7. The mobile terminal of claim 5, wherein if the third command for restricting the transmission of the next display data is received via the user input unit, the controller maintains last displayed data on the external display device.

8. The mobile terminal of claim 1, wherein the prescribed visual effect comprises an indication window indicating that the privacy property is set for the next display data, and the indication window includes a menu for selecting an option to transmit the next display data.

9. The mobile terminal of claim 1, wherein the communication unit further comprises:
at least one wireless communication unit configured to wirelessly exchange the at least one display data externally; and
an interface unit configured to exchange the at least one display data externally on wire.

10. The mobile terminal of claim 1, wherein the at least one display data comprises a text included in a specific field, a still image data, and a video streaming data.

11. The mobile terminal of claim 1, wherein if the privacy property indicating the sharing restriction is set for the at least one display data, the controller applies a prescribed visual effect to the privacy property set display data.

12. A method of controlling a mobile terminal, the method comprising:
searching for external display devices via a communication unit;
establishing a data path to a specific external display device from the searched external display devices;
preparing display data displayed on a display unit to be transmitted to the specific external display device via the data path;
determining whether a privacy property indicating a sharing restriction is set for the display data; and
determining whether to transmit the display data via the data path according to a result of the privacy property determination,
wherein if the privacy property indicating the sharing restriction is set for a next display data to be transmitted to the external display device, the method further comprises displaying a prescribed visual effect indicating that the privacy property is set for the next display data via the display unit before displaying the next display data on the display unit when the at least one display data is sequentially transmitted to the external display device.

13. The method claim 12, further comprising:
receiving, via a menu, a first user input to transmit the privacy property set display data, wherein the prescribed visual effect includes the menu for selecting an option to transmit the privacy property set display data; and
transmitting the privacy property set display data to the specific external device.

14. The method claim 13, further comprising:
receiving, via the menu, a second user input to restrict transmission of the privacy property set display data to the specific external device; and
transmitting a preset image different from the privacy property set display data to the specific external device.

15. The method claim 13, further comprising:
receiving a second user input to restrict transmission the privacy property set display data to the specific external device via the menu; and
maintaining a previously displayed image on the specific external device.

16. The method claim 12, further comprising:
generating a first list including the display data;
receiving, via a user input unit, a command to exclude the display data having the privacy property indicating the sharing restriction;
generating a second list excluding the display data, which is included in the first list, with the privacy property indicating the sharing restriction based on the command; and
transmitting the second list to the specific external display device based on the command.

17. The method of claim 12, wherein the display data comprises a text included in a specific field, a still image data, and a video streaming data.

* * * * *